July 30, 1957 H. C. PYE 2,801,289

TELEPHONE FOR USE IN NOISY LOCATIONS

Filed May 2, 1956 2 Sheets-Sheet 1

INVENTOR.
HAROLD C. PYE

BY *[signature]*

ATTY.

TELEPHONE FOR USE IN NOISY LOCATIONS

Filed May 2, 1956 2 Sheets-Sheet 2

INVENTOR.
HAROLD C. PYE
BY Mc Walter Owen
ATTY.

United States Patent Office 2,801,289

Patented July 30, 1957

2,801,289

TELEPHONE FOR USE IN NOISY LOCATIONS

Harold C. Pye, Oak Park, Ill., assignor to General Telephone Laboratories, Incorporated, a corporation of Delaware Application May 2, 1956, Serial No. 582,227

7 Claims. (Cl. 179—81)

This invention relates to improvements in telephone subsets of the anti-sidetone booster type, particularly such as may be located on shipboard for a ship service telephone system or in other noisy locations.

The extent to which the transmission and reception of speech is hindered when using a telephone substation is dependent to a very great extent upon the intensity of the ambient noise and its nature at both the transmitting and receiving locations. It is common knowledge that in noisy locations if a person is able to shout above the ambient noise he can make himself heard. The conventional telephone transmitter however only operates properly within a limited band of sound intensities. It does not respond to intensities below a certain minimum and is unable to reproduce sound at intensities exceeding a certain maximum. If the ambient noise intensity is at or near this maximum the transmitter will merely transmit an irritating frying sound and be unable to accept any additional sound from the voice, even if the voice is above the level of the noise. If it should be possible to impart an intelligible sound to the transmitter and it in turn transduces it intelligibly there would still remain other problems to contend with. If the receiving telephone too is located in an area where there is high ambient noise, the noise in the free ear of the user would interfere and some of it may even leak into the listening ear past the earcap of the receiver. The noise in the free ear however annoying, will not interfere with the reception at the receiving ear unless it is 40 to 60 decibles above the sound at the receiving ear when the bone conduction will be sufficient to make it heard in the receiving ear over the sound received from the telephone. A properly designed earcap will of course eliminate much of the leakage past the earcap, however there will still be another noise at this location. This other noise will be the sidetone from the listeners own telephone picking up the ambient noise. To avoid this latter fault involves the design of a telephone with pratcically zero sidetone. Though this is not impossible, it is practically very difficult. The extent to which sidetone is reduced does not depend upon the substation circuit alone but also upon its component parts. It is known that sidetone may be supressed when a telephone is connected to a line of known impedance, but this is now practically feasible only at fixed frequencies. During conversation the voice covers a wide range of frequencies, and to achieve a balance at all frequencies it is necessary that the impedance of the telephone including the sidetone balancing impedance thereof vary with frequency in such a manner that sidetone over the entire used audio frequency band remains zero.

Accordingly, it is a general object of the present invention to provide a telephone substation with a circuit of the anti-sidetone type that is especially designed to be used with a particular type of telephone line and which embodies means for substantially reducing the side tone for the entire required portion of the audio frequency band.

Another object of this invention is the provision of an improved yet exceedingly simple and rugged telephone station for use in automatic telephone systems.

Another object of this invention is to provide a telephone capable of providing improved articulation when used in very noisy locations.

A further object of this invention is the improvement in the components of an invariable anti-sidetone circuit whereby the sidetone will be inaudible.

An additional object of this invention is to provide a telephone circuit having a sidetone balancing impedance which will keep the sidetone below a predetermined audible level throughout the useable frequency band for a line of predetermined impedance.

An additional object of this invention is to provide a telephone circuit that incorporates most effectively components suitable for use in high ambient noise.

These objects are attained in this invention through the cooperative functioning of some or all of the following features incorporated in this invention.

The first of these features is a sidetone balancing impedance that with a line of predetermined impedance will provide a sidetone balance for the frequencies of the voice band used for telephone communication such that practically no sidetone exists in the receiver of the transmitting telephone.

Another feature of this invention is the simple structure of the sidetone balancing impedance.

Further objects and features not specifically mentioned here will be apparent from the detailed description, accompanying drawings and claims which follow.

The drawings comprising Figs. 1 to 5 inclusive show the details of this invention.

Figure 4:
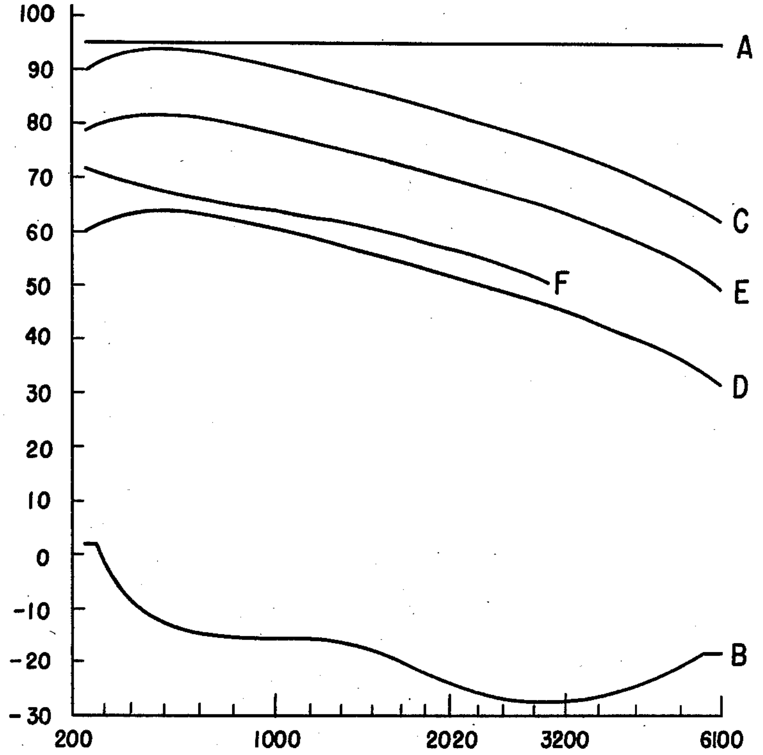
Fig. 4 is a graph showing the limiting human factors requiring consideration in the design of this telephone.

Before describing this invention for the transmission and reception of articulate speech in high ambient noise, the factors whose characteristics must be known should first be considered. Among these are the following:

1. The level of the average speakers voice and its characteristics, which as determined by various observers and the currently accepted standard is 105 db above $10^{-16}$ watt per square centimeter at 1½ centimeter from the lips. By shouting a person can raise this level about 12 db. The average root mean square spectrum of this speech is shown on the graph of Fig. 4 as line E. Line C is plotted 12 db above the average root mean square level and line D is plotted 18 db below. As can be seen from this graph the total dynamic range of the voice is about 30 db. If all of this region between lines C and D is audible the speech should be perfectly intelligible.

2. The level of the hearing acuity of the average ear and its characteristics, is apparent from the graph of Fig. 4 as being between lines A and B. The line B at the bottom of the graph represents the minimum audible pressure for a continuous spectrum sound and line A at the top represents the level of sound at which the threshold of feeling is reached. A sound much louder than this will cause severe pain.

3. The intensity and character of the noise in which the equipment is to perform. Since the equipment of this invention is to be primarily utilized on shipboard, the noise of the engine rooms thereon where the noise is most severe, was studied. It was discovered that this noise, as well as the noise normally encountered in various industrial locations, is very closely approximated in its masking qualities by the continuous spectrum noise (Standard ASA) of an equal aggregate level. With a Standard ASA noise at an aggregate level of 100 db as shown by line F on Fig. 4, it is seen that no single component frequency of the noise exceeds a level of 72 db.

Knowing the limitations of the voice, hearing mechanism and the noise in which this telephone is to operate, an investigation of the possibilities of articulate speech transmission within these limitations should next be considered. It is known that a tone to be just audible in a noise must exceed the total R. M. S. level of the noise in the critical band of frequencies centered about the frequency of the tone, and that the level of the noise or tone must not exceed the limits of the threshold of tolerance and must be above the threshold of audibility. A critical bandwidth is that bandwidth at which the masking of the tone by the noise just reaches its stable value and is variable with the frequency ("Auditory Patterns" by Harvey Fletcher, Bell Tel. Labs. Monograph B–1205, 1940). Observations indicate that when a critical band of frequencies is at a just audible level the total energy in the band is the same as the energy of a just audible pure tone located at the center of the band.

A method for computing the possible articulation of a system when the noise and voice intensities are known has been developed by Leo L. Beranek (Proc. of the I. R. E. September 1947). This method consists of utilizing twenty bands of equal contribution to an articulation index (A) between the frequencies of 200 and 6100 cycles, which range is considered sufficient for 100% articulation. This articulation index (A) is linearly related to the percent of the dynamic voice range, as limited by lines C and D on the graph of Fig. 4, that can be heard by the listener, and is uniquely related to articulation scores. Each of the 20 bands makes a maximum contribution of 5% to the articulation index (A) which is the sum of the contributions of all the bands. The percent of the maximum contribution contributed by any one band is designated $W_n$. Rewriting this in mathematical form we have $A=\Sigma\ 0.05\ W_n$.

From the above discussion it is evident that the performance of this telephone of my improved design is dependent upon the ability of its transmitter to function properly when exposed to sound of a very high intensity, and that it have an extended high frequency response within useable limits. A transmitter satisfying these needs is described in the copending application of H. C. Pye, Serial No. 512,672, filed June 2, 1955. With a transmitter as disclosed in the copending Pye application the working range of frequencies of this telephone by my improved design is between 100 to 4300 cycles, thus it is seen that about two of the bands from 4250 cycles to 5050 cycles and from 5050 cycles to 6100 cycles are omitted. Since each band contributes 5% to the articulation index (A) there is an ultimate possibility of an articulation index (A) of 90 for this telephone in a no noise condition. This limitation however is not a serious drawback when we consider that the average telephone has a working frequency range only up to 3000 cycles, or at best an articulation index of 80. Now looking at the graph of Fig. 4 it is seen that in a noise field of 100 db with a person shouting into the transmitter of this telephone it is possible to obtain an articulation index of 74. By using Beranek's experimentally obtained graph showing the relations between word or syllable articulation and the articulation index A, an articulation index of 74 would give an articulation score of 80%. This score is equivalent to that of a very high quality system. An entirely satisfactory system would need only to have an articulation index greater than 50, and systems with an articulation index between 30 and 50 would be serviceable.

It is known that people working in high ambient noise do become more tolerant to it and the threshold of tolerance for their ears is raised from 5 to 10 db. The transmitter of this telephone will work with sounds of greater intensities than the values shown on the graph so that if the people who are to use this telephone can withstand the higher sound intensities this telephone will still provide satisfactory service. The primary limitation to the use of this telephone will be the person using it, if he can withstand the greater sound intensities and can shout above the noise this telephone will be able to serve him.

Figure 1:
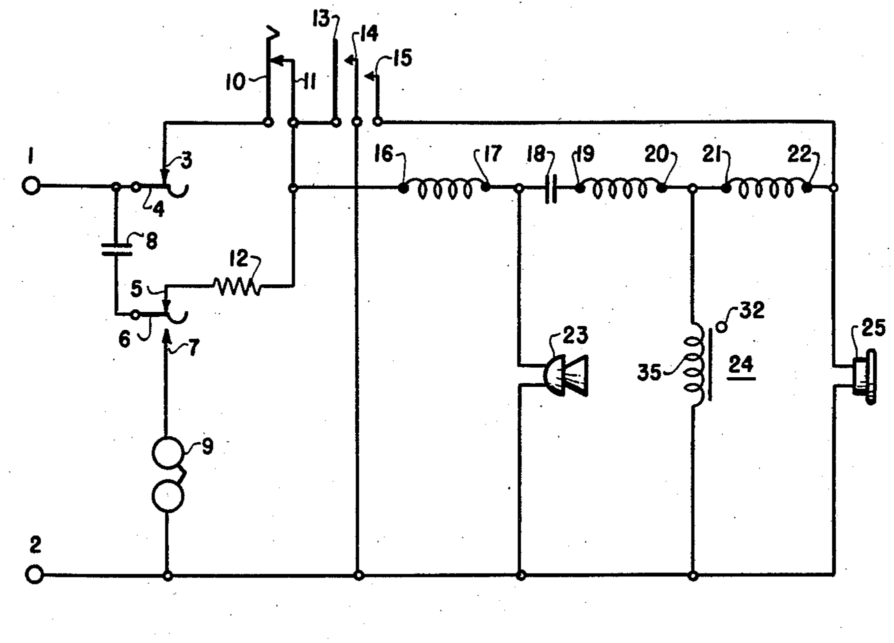
Fig. 1 shows the telephone circuit of my invention.

Referring now to Fig. 1. In this figure two loop conductors, 1 and 2, are shown on the left, which conductors are assumed to extend to the line connecting or switching equipment of an automatic telephone exchange. The line switching equipment provided in the exchange for setting up connections between the various lines of the system may be of any desired impulse responsive type and since this equipment forms no part of the present invention, it is not shown.

Bridged across conductors 1 and 2 to the left of the normally open switchhook contacts 3 and 4 are the capacitor 8, the normally closed switchhook contacts 6 and 7 and the ringer 9 arranged in series. As thus arranged, alternating current employed for ringing, when applied, will pass through the bridge and actuate the ringer, while the switchhook contacts are in the normal position.

When the handset is removed from the cradle, contacts 3, 4, 5, 6 and 7 controlled by the switchhook are placed in an off-normal position. Contacts 3 and 4 close to complete a talking circuit through dial impulse contacts 10 and 11 and contact 6 breaks from contact 7 and connects to contact 5 to complete a noise suppression circuit for the dial impulse contacts 10 and 11. This noise suppression circuit employs the off-normal contacts 3 and 4, capacitor 8, off-normal contacts 5 and 6, and a non-inductive resistor 12 shunting the dial impulse contacts 10 and 11. Shunt contacts 13, 14 and 15 are employed to shunt the talking instrumentalities of the telephone, to lower the substation resistance and to prevent noise in the receiver during the pulsing period.

Figure 5:
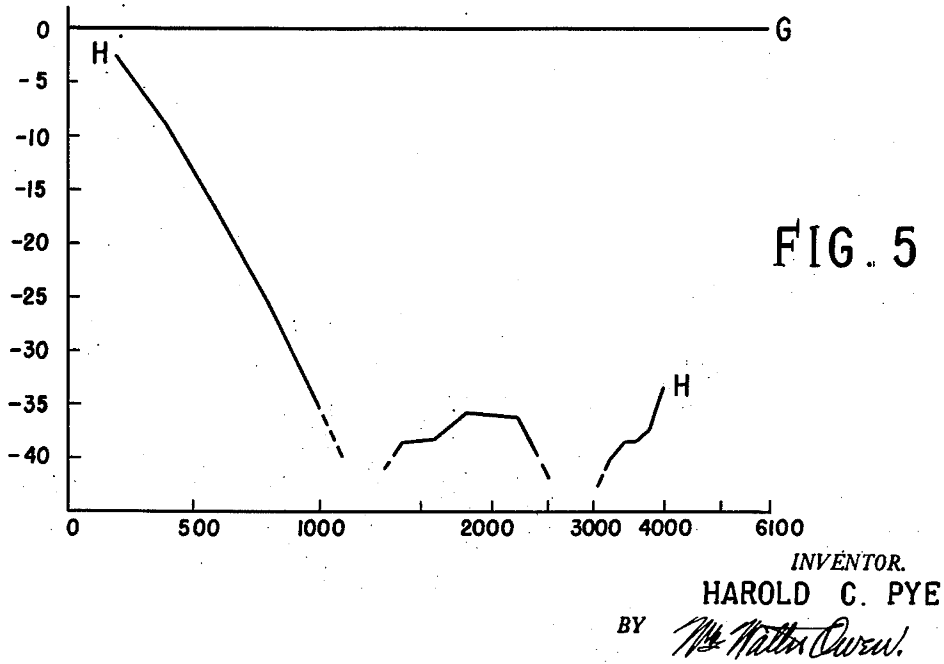
Fig. 5 is a graph showing the level of the sidetone as compared with the received level.

For transmitting, the transmitter 23 is energized by direct current from the exchange via the line conductors 1 and 2 through a circuit path which includes induction coil winding 16—17, dial pulsing contacts 10 and 11, and off-normal contacts 3 and 4. This energizing path is also part of the alternating current voice path for transmitting. The other part of this alternating current path is comprised of capacitor 18, induction coil winding 19—20 and the sidetone balancing auxiliary impedance 24 in series, all shunting the transmitter 23, with the induction coil winding 21—22 in series with the receiver 25, shunting the sidetone balancing auxiliary impedance 24. The actuation of the transmitter sets up an alternating voltage therein. The consequent alternating current flowing through the transmitter divides at the junction of induction coil terminal 17 and capacitor 18. A part of this current flows through induction coil winding 17—16, dial pulsing contacts 11 and 10, off-normal switchhook contacts 3 and 4 and then out over the line to complete a loop to the transmitter. The other portion of this current flows through capacitor 18, induction coil winding 19—20 and through the sidetone balancing impedance 24 to complete another loop to the transmitter. A possible shunt path, around the sidetone balancing impedance 24, exists in induction coil winding 21—22 and receiver 25. When the induction coil windings 17—16 and 19—20 are properly proportioned, and the sidetone balancing impedance 24 is able to present an impedance that varies with frequency in a manner similar to the line, there is established a balanced condition such that the voltage induced in winding 21—22 is equal and opposite to the voltage drop across impedance 24. Thus it is seen that there will be no current flow in the branch of winding 21—22 and the receiver 25 and consequently no appreciable sidetone in the receiver 25. This zero sidetone condition is in accord with the theory expressed by G. A. Campbell and R. M. Foster in the Transactions of the A. I. E. E., vol. XXXIX (1920) for single frequencies with lines of known impedance. In the embodiment of this invention with a line of known impedance we have a sidetone balancing impedance that maintains a balance with the line at all frequencies within the range of frequencies from 200 to 4500 cycles per second. The graph of Fig. 5 shows the difference in db between the level of the sidetone H at the receiving telephone when its transmitter has a 110 db pure tone sound input and the level of the received sound shown as a line G at 0 db level. This shows that even when the ambient sound level at the location of the receiving telephone is at such an unbearable level the sidetone is still so far below not only its input but even so far below the level of the incoming sound as to make it completely negligible when considering its effects upon articulation.

This zero sidetone is achieved with a conventional anti-sidetone circuit of the type disclosed by G. A. Campbell in Patent No. 1,254,471. As brought out in this Campbell patent, no current flows through the receiver during transmission when the circuit is proportioned for transmitter and receiver conjugacy. To keep the receiving efficiency at the maximum consistent with invariable anti-sidetone circuit performance it is also necessary that the line and auxiliary impedance be conjugate. These conditions are readily met in circuits set up in a laboratory where compactness, economy of components and circuit reliability are not major factors for consideration. Where such factors must be considered in designing instruments for field use the satisfaction of the requirements enumerated in the Campbell patent is more difficult.

Figure 3:
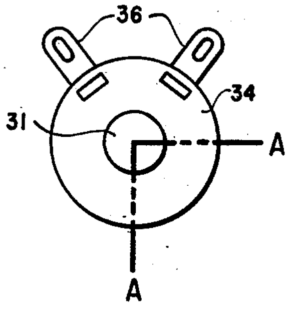
Fig. 3 shows an end view of the auxiliary impedance.
Figure 2:
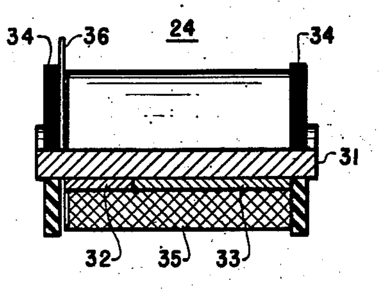
Fig. 2 shows a partial sectional view along lines A—A of Fig. 3 of the auxiliary impedance used in this circuit.

This is because the basic components entering into the construction are not ideal in their characteristics and the auxiliary impedance must have characteristics that vary with frequency in the same manner as the line. An impedance meeting these requirements is shown at 24 in Fig. 1 and is a feature of this invention. Its construction is disclosed in Figs. 2 and 3. As can be seen it is constructed of an iron core 31 on which is placed a short metal sleeve 32. A sleeve of some insulating material 33 is placed on the remaining portion of the core between the spool heads 34. A winding of copper wire 35 is then placed on the core and the ends are connected to terminals 36 mounted on one of the spool heads. To vary its characteristics this unit makes use of the eddy current and hysteresis losses in the metal slug and core. Its characteristics are such that it acts as a frequency dependent resistor, with its resistance increasing with increasing frequency and decreasing with decreasing frequency. By properly proportioning the size of the core, the metal slug and the size of the winding it is possible to very closely match the characteristics required. In this embodiment a 0.22 inch diameter core 1.124 inches long of iron is used. The slug is of naval bronze 0.59 inch long and of 0.30 inch outside diameter. Over this is placed a winding of 650 turns of number 29 AWG enameled copper wire. Constructed in such a manner this auxiliary resistor will have the proper characteristics for use with a shipboard telephone line.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. In combination with a telephone line having a predetermined impedance frequency response characteristic in the audio frequency band, a telephone substation circuit comprising a transmitter with an essentially flat output between 300 and 4000 cycles, a clamped diaphragm type receiver with a flat frequency response to 4000 cycles, an induction coil having first, second and third windings poled serially aiding, a capacitor between the first and second windings, a balancing network for sidetone reduction including said third winding, said receiver and a reactive impedance, said reactive impedance consisting of a coil wound on a magnetic core, a sleeve on one end of said core, said sleeve imparting a characteristic to said impedance so that the resistance thereof varies with the frequency and maintains a sidetone balance for the entire useable frequency range in a basically simple circuit.

2. In combination with a telephone line having a predetermined impedance frequency response characteristic in the audio frequency band, a telephone substation circuit comprising a transmitter with an essentially flat output between 300 and 4000 cycles, a clamped diaphragm type receiver with a flat frequency response between 300 and 4000 cycles, an induction coil having first, second and third windings poled serially aiding, a capacitor between the first and second windings, a balancing network for sidetone reduction including said third winding, said receiver and a reactive impedance, said reactive impedance consisting of a coil wound on a magnetic core, a sleeve of naval bronze on one end of said core, said impedance by reason of the characteristic imparted to it by said sleeve varying its impedance with the voice frequencies whereby sidetone balance is maintained throughout the useable frequency range.

3. In combination with a telephone line having a predetermined impedance frequency response characteristic in the audio frequency band, a telephone substation circuit comprising a transmitter with an essentially flat output, and which will not saturate with sound intensities of 110 db, a receiver with a flat response, an induction coil having first, second and third windings poled serially aiding, a capacitor between the first and second windings, a balancing network for reducing sidetone to a negligible value including said third winding, said receiver and an impedance, said impedance consisting of a coil wound on a core of magnetically permeable material, a sleeve of naval bronze on one end of said core, said impedance by reason of the eddy current and hysteresis losses in said sleeve and core varying its resistance in a manner such that sidetone balance is maintained throughout the entire useable frequency range.

4. In combination with a low resistance telephone line having a predetermined impedance frequency response characteristic in the audio frequency band, a telephone substation circuit comprising a transmitter with an essentially flat output to 4000 cycles and capable of transmitting articulate intelligence in ambient noise fields of 110 db, a receiver with a flat response to 4000 cycles, an induction coil having first, second and third windings poled serially aiding, a capacitor between the first and second windings, a balancing network for reducing sidetone to a negligible value including said third winding, said receiver and an impedance, said impedance consisting of a coil wound on a core of magnetically permeable material, a sleeve of naval bronze on said core, said sleeve causing said impedance to act as a frequency dependent resistor, with its resistance increasing with increasing frequency whereby the sidetone of said telephone is maintained at a constant low level throughout the useable frequency range.

5. In combination with a telephone line, a telephone substation circuit comprising a transmitter with an essentially flat output to 4000 cycles, a clamped diaphragm type receiver with a flat frequency response to 4000 cycles, an induction coil having first, second and third windings poled serially aiding, a capacitor between the first and second windings, a balancing network for sidetone reduction including said third winding, said receiver and a reactive impedance, said reactive impedance consisting of a coil wound on a magnetic core, a sleeve of conductive material on said core, said impedance varying its resistance with the variations in frequency of the voice in a manner such that the sidetone is negligible during transmission.

6. In combination with a telephone line having a predetermined impedance frequency response characteristic in the audio frequency band, a telephone substation circuit comprising a transmitter with an essentially flat output between 300 and 4000 cycles, a clamped diaphragm type receiver with a flat frequency response between 300 and 4000 cycles, an induction coil having first, second and third windings poled serially aiding, a capacitor between the first and second windings, a balancing network for sidetone reduction including said third winding, said receiver and a reactive impedance consisting of a coil wound on a magnetic core, a sleeve of navel bronze on one end of said core, said impedance by reason of the characteristic imparted to it by said sleeve, providing a reactance variable with frequency, and closely matching the reactance of said telephone line.

7. For use in extremely noisy locations, the combination of a telephone transmission line of low resistance with a pair of telephones capable of transmitting and receiving voice intelligence at each end of said line, each said telephone comprising a transmitter with an essentially flat output to 4000 cycles and capable of transmitting articulate intelligence in ambient noise fields of 100 db, a receiver with a flat response to 4000 cycles, an induction coil having first, second and third windings poled serially aiding, a capacitor between the first and second windings, a balancing network for reducing sidetone to a negligible value including said third winding, said receiver and an impedance, said impedance comprising a coil wound on a core of magnetically permeable material, a sleeve of naval bronze on said core, said impedance, by reason of the eddy current and hysteresis losses in said sleeve and core, varying its resistance in such a manner that the sidetone in the receiving telephone will always be below the level of the signal received from the transmitting telephone.

No references cited.